United States Patent [19]
Wurst

[11] 3,835,733
[45] Sept. 17, 1974

[54] INTERNAL COMBUSTION ENGINE TORQUE MEASURING APPARATUS PROVIDING AN ELECTRICAL CONTROL SIGNAL

[75] Inventor: Bert Wurst, Moglingen, Germany

[73] Assignee: Robert Bosch GmbH, Stuttgart, Germany

[22] Filed: Oct. 20, 1972

[21] Appl. No.: 299,516

[30] Foreign Application Priority Data
Dec. 22, 1971  Germany.......................... 2163808

[52] U.S. Cl.................................... 74/866, 74/851
[51] Int. Cl............................................ B60k 21/00
[58] Field of Search.............................. 74/866, 851

[56] References Cited
UNITED STATES PATENTS 3,680,410  8/1972  Sumiyoski et al..................... 74/866
3,726,159  4/1973  Mizote................................. 74/866
3,739,661  6/1973  Harrison.............................. 74/866

FOREIGN PATENTS OR APPLICATIONS
1,201,612  8/1970  Great Britain....................... 74/851

*Primary Examiner*—Samuel Scott
*Assistant Examiner*—P. S. Lall
*Attorney, Agent, or Firm*—Flynn & Frishauf

[57] ABSTRACT

A control valve which varies the hydraulic pressure of an automatic transmission in proportion to the engine torque, instead of being controlled by the intake manifold vacuum, is controlled by an electrical signal which is a composite of a signal proportional to engine speed, and a signal representative of the position of the accelerator pedal. Engine speed signals are derived from distributor signals, the speed signals then being modulated by a factor dependent upon the position of the accelerator pedal or of the throttle.

12 Claims, 3 Drawing Figures

3,835,733

INTERNAL COMBUSTION ENGINE TORQUE MEASURING APPARATUS PROVIDING AN ELECTRICAL CONTROL SIGNAL

This invention relates to apparatus for producing a physical force, particularly an electrical voltage, proportional to the torque of a drive shaft or a motor, particularly an internal combustion engine of a motor vehicle.

The usual motor vehicle automatic transmissions most commonly comprise set of planetary gears that are placed into action for shifting from one gear to another. For the shifting operation in each case a single gear of the set, for example the "sun" or the "planets" or a countershaft is separately slowed with the help of hydraulically actuated couplings or brake bands. Thereafter the gears are shifted by the selection and slowing down of a particular element of the planetary gear set.

The operation of shifting from one gear to another must be effected without jolting and, furthermore, the wear on the couplings and brake bands must be kept within practical limits. Hence the hydraulic pressure with which the couplings or brake bands are actuated must be proportional to the torque delivered by the motor. The intake suction or vacuum in the intake manifold of an internal combustion engine is a good measure of the torque of the engine. This suction line vacuum is hence commonly used to control the actuating pressure of the couplings or brake bands. In particular a vacuum responsive diaphragm connected to the vacuum line is utilized to control the hydraulic pressure.

Recently, however, the practice has been instituted to return exhaust gases into the intake manifold to reduce the pollution of the exhaust gases with harmful materials. In such cases the intake vacuum can no longer directly serve as a measure for motor torque.

It is an object of the invention to provide apparatus for measuring the torque of engines that depend on measurable conditions of a running engine other than the intake vacuum.

Subject matter of the present invention: Briefly, a measurement of engine torque suitable for control of hydraulic pressure in an automatic transmission is obtained by combining a measurement of the position of the throttle and a measurement of the rate of rotation of the engine (speed), more particularly using an arrangement for producing a resultant electrical signal in which the output of one of the foregoing measurements modulates the output of the other. A particularly effective operation is obtained if the measurement of the throttle position and the measurement of the engine speed are both accomplished by means producing an output in the form of an electrical signal and if these means are interconnected in a circuit combining and processing the resultant signal. The final processing of the resultant signal preferably uses an operational amplifier and an output stage which both provides a feedback to the operational amplifier and a control current to a proportional control valve in the hydraulic system.

An illustrative embodiment of the invention is described in further detail with reference to the accompanying drawings in which.

Figure 1:
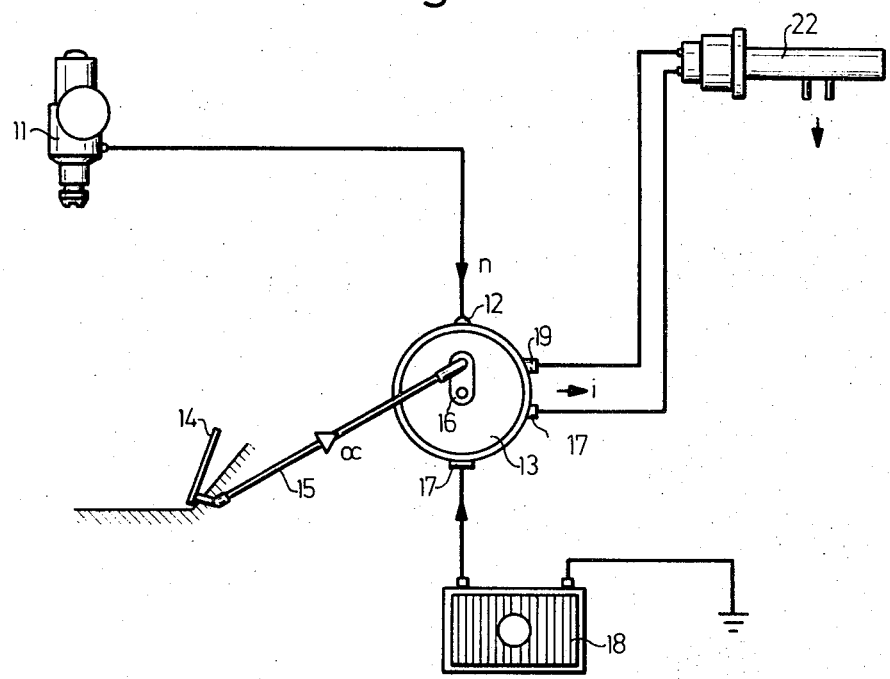
FIG. 1 is a diagrammatic elevation view of a complete apparatus embodying the invention.

FIG. 1 shows an ignition distributor 11 which is connected with an internal combustion engine not shown in the drawing. An interrupter contact inside the distributor 11 is connected by a conductor to a first input 12 of an evaluation apparatus 13. An accelerator pedal 14 controlling the motor throttle (not shown) is connected by a rod linkage 15 to a second input 16 of the evaluation apparatus 13. The positive terminal of the battery 18 is connected to a terminal 17 of the evaluation apparatus 13, while the negative battery terminal is grounded to the vehicle chassis. The output terminals 19 and 21 of the evaluation apparatus 13, which provides here a resultant electrical signal, are connected to a pressure regulator 22 which controls the pressure in the hydraulic system (not shown) of the vehicle transmission.

Figure 2:
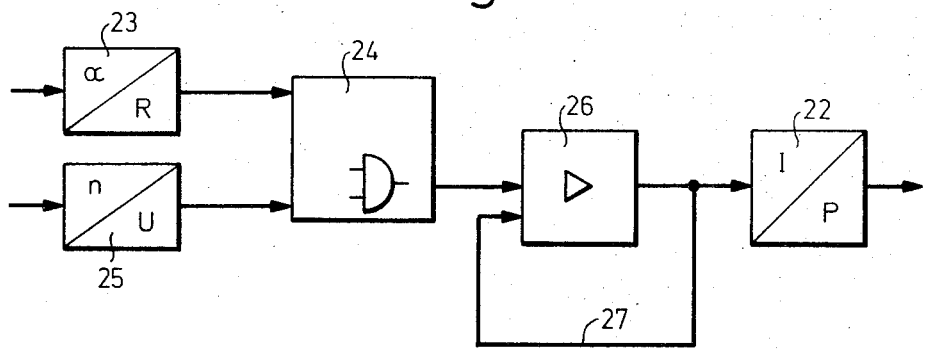
FIG. 2 is a block diagram of the circuit means for producing the resultant electrical signal.

FIG. 2 shows the evaluation apparatus; it includes a load transmitter 23. This load transmitter 23 is, as shown in FIG. 1, connected by the rod linkage 15 with the accelerator pedal 14. The output of load transmitter 23 is connected to a first input of a combining stage 24. The evaluation apparatus further includes an engine speed transmitter 25, the input of which is, as shown in FIG. 1, connected with the distributor 11 and the output of the engine speed transmitter is connected to a second input of the combining stage 24. The output of the combining stage 24 is supplied to an amplifier 26. A feedback connection 27 leads from the output of amplifier 26 to the input thereof. In addition, the output of amplifier 26 is connected to the input of the pressure regulator 22.

Figure 3:
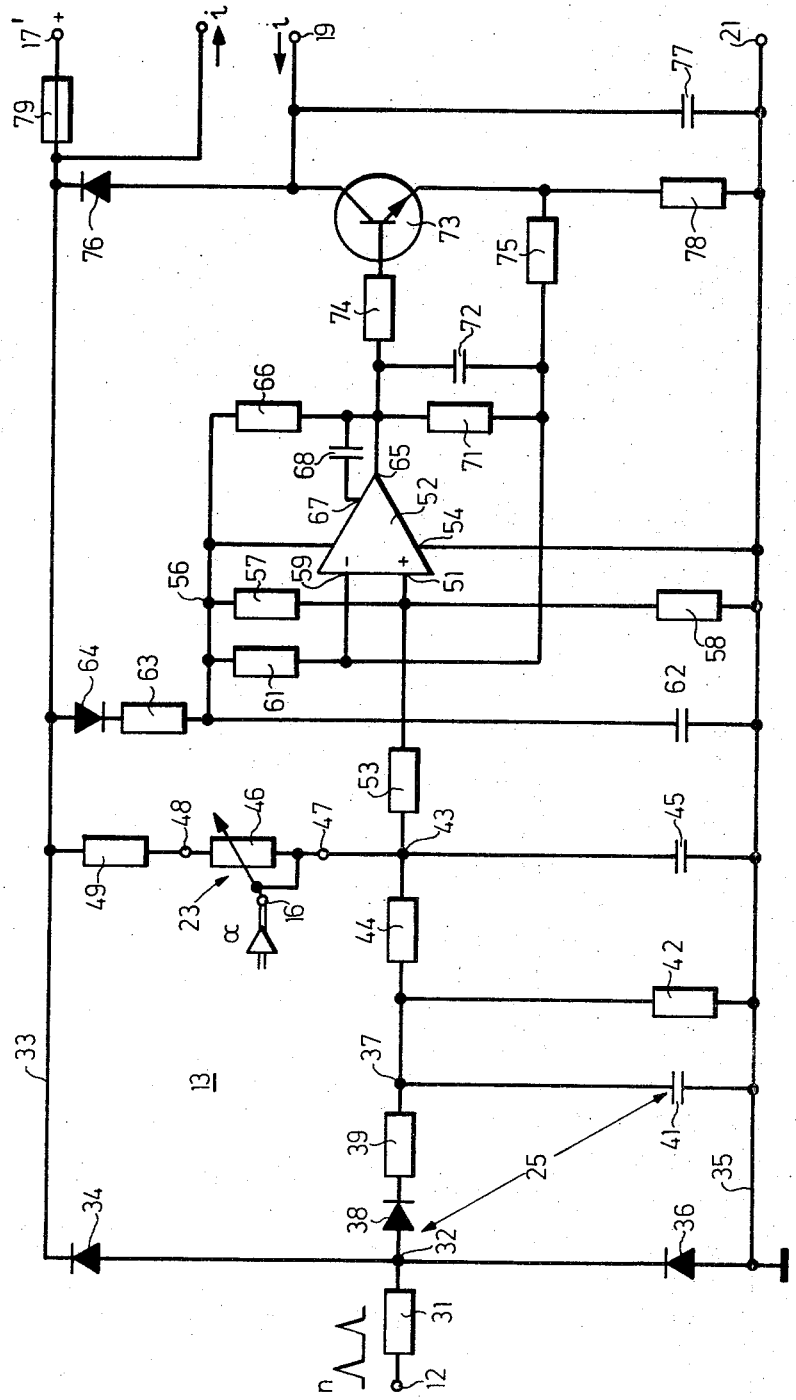
FIG. 3 is a circuit diagram of the same circuit means.

The circuit diagram given in FIG. 3 shows the evaluation apparatus 13 to the first input 12 of which the appropriate terminal of the distributor 11 may be connected. A protective resistor 31 connects the input terminal 12 just mentioned to a junction point 32 which is connected over diodes 34 and 36 to the positive and negative supply conductors, respectively, of the circuit. The cathode of diode 34 is connected to positive battery and the anode of diode 36 is connected to negative battery, so that both diodes are normally nonconducting.

Between junction point 32 and another junction point 37 is a series connection of a diode 38 and a resistor 39, the diode 38 having its anode connected to junction point 32. Between junction point 37 and the negative battery line 35 a charging capacitor 41 and a discharge resistor 42 are connected in parallel. Between junction 37 and still another junction point 43 is a resistor 44, whereas between junction point 43 and the negative battery line 35 a capacitor 45 is connected.

The second input 16 of the evaluation apparatus 13 is mechanically connected with the slider of a potentiometer 46. The slider arm of potentiometer 46 is connected to fixed terminal 47 of potentiometer 46, which in turn is connected to junction point 43. The other fixed terminal 48 of potentiometer 46 is connected to positive battery line 33 over a resistor 49. A resistor 53 is connected between junction point 43 and the positive input 51 of an operational amplifier 52. The negative battery connection 54 of operational amplifier 52 is connected directly to negative battery line 35, but the positive battery connection 55 of operational amplifier 52 is connected to a junction point 56. A resistor 57 is connected between the positive or direct input terminal 51 of the operational amplifier and junction point 56, while a resistor 58 is connected between positive input terminal 51 and negative battery line 35. A resistor 61 is connected between the negative or inverting input terminal 59 of operational amplifier 52 and junction point 56. A capacitor 62 is connected between junction point 56 and negative battery line 35 and a series connection of a resistor 63 and a diode 64 is provided between junction point 56 and positive battery line 33, with the anode of diode 64 connected to positive battery line 33.

The output terminal 65 of operational amplifier 52 is connected to junction point 56 over a resistor 66 and to a control input 67 of this same operational amplifier 52 over a capacitor 68. Output terminal 65 is also connected by a feedback circuit comprising the parallel combination of resistor 71 and capacitor 72 to the inverting input terminal 59 of the operational amplifier 52. Finally, output terminal 65 of operational amplifier 52 is connected to the base of a transistor 73 over a resistor 74.

The emitter of transistor 73 is connected by a feedback resistance 75 to the negative input terminal 59 of operational amplifier 52. The collector of transistor 73 is connected through a diode 76 to positive battery line 33 with the cathode of diode 76 connected to positive battery line 33. A capacitor 77 is connected between the collector of transistor 73 and negative battery line 35 while a resistor 78 is connected between the emitter of transistor 73 and the negative battery line 35. The collector of transistor 73 is also connected to a first output terminal 19 of the evaluation apparatus. The second output terminal 17 of the evaluation apparatus is connected to the positive battery line. A protective device, for example a fuse 79, is connected between positive battery line 33 and the external positive battery connection 17 of the evaluation apparatus.

The operation of the circuit of FIG. 3 is as follows. Ignition pulses which reach the evaluation apparatus over its first input terminal 12 from the distributor 11 are limited in amplitude by diodes 34 and 36. These diodes also serve as protection against reverse connections. In the case of a reverse connection of the evaluation apparatus 13 a high current will flow over diodes 34 and 36, which would then be poled in their conducting direction, causing the safety fuse 79 to blow. In this manner the semi-conductors and other circuit components of the evaluation apparatus 13 would be protected from damage. The interrupter that forms part of the distributor 11 periodically closes the first input of the evaluation apparatus to ground. The frequency of these groundings is strictly proportional to the engine speed. During the periods in which first input connection 12 is not connected to ground, this input connection is at a positive potential. The charging of capacitor 41 occurs essentially over resistor 31 since the diode 38 makes an effective connection of resistors 31 and 39 during the time for which the first input terminal 12 is at positive potential. When the ignition interrupter is closed, i.e. when input terminal 12 is grounded, capacitor 41 discharges primarily over discharge resistor 42, since diode 38 is blocked under these conditions. Capacitor 45 forms a low pass filter of the T configuration with resistors 44 and 53. When the position of potentiometer 46 remains unchanged, a steady or slowly varying potential is available at the positive input terminal 51 of operational amplifier 52 the magnitude of which depends on the rate of rotation of the motor crankshaft.

The resistance value introduced by potentiometer 46 depends upon the position of the accelerator pedal 14. The potentiometer 46 is a convenient form for the load transmitter or load indicator generally represented at 23 in the block diagram of FIG. 2. Variation of the resistance value introduced in the circuit by potentiometer 46 has the effect of modulating the voltage delivered to subsequent stages from charging condenser 41. The potential thus made available to the positive input terminal 51 of operational amplifier 52 is thus dependent both on the engine speed n and on the position $\alpha$ of the accelerator pedal 14.

The load transmitter or load indicator 23 represented in a general way in FIG. 2 thus comprises, in the case of FIG. 3, at least the potentiometer 46 while the engine speed transmitter or indicator 25 comprises at least the resistor 31, the diode 38, the resistor 39 and the charging condenser 41. The combining stage 24 contains principally the resistances 42,44 and 53 and capacitor 45. As described below, the amplifier 26 comprises operational amplifier 52 and the circuits related to it and also transistor 73 and its circuit.

Operational amplifier 52 serves to amplify the voltage delivered by the combination of the load indicator and the speed indicator. That voltage is a voltage that depends upon the motor torque. Operational amplifier 52 must also of course regulate the current supply over the output terminals 17 and 19 to operate the pressure regulator 22. The actual value of the current in the magnetic positioning mechanism of pressure regulator 22 must be compared with the signal at the positive input terminal 51 of the operational amplifier by means of a feedback coupling resistor 75. The comparison (subtraction) is effected by applying the feedback signal to the negative input terminal 59 of the operational amplifier. This feedback prevents temperature induced changes in the resistance of the coil of the magnetic positioning device of the pressure regulator from interfering with the desired linear relationship between the actuating current and the signal provided at the positive input terminal 51 of the operational amplifier. The positioning of the control system contained in the pressure regulator 22 thus remains independent of the outside temperature for a wide range of conditions.

With the help of diode 64 and resistor 63, variations in the supply voltage (terminal 17) are to a large extent prevented from affecting the function of operational amplifier 52. Because with voltage fluctuations the forward voltage of diode 64 varies differently from the voltage drop across an ohmic resistance, a variation of the supply voltage takes effect at the cathode of diode 64 more strongly than if the diode 64 were replaced by an ohmic resistor. Suitable dimensioning of the network associated with operational amplifier 52 then leads to the stabilizing of the operating parameters of the evaluation apparatus 13. In this manner the current $i$ flowing over the output terminals 19 and 21 is also largely independent of variations in the supply voltage.

Transistor 73 is a power transistor which is able to control the necessary levels of current for the current $i$ of the magnetic positioning actuator of the pressure regulator 22. The diode 76 serves to short circuit the kick-back current that occurs when the magnetic actuator is switched off.

The accelerator pedal 14 is of course mechanically coupled to the throttle of the motor, and every particular position of the accelerator pedal corresponds to a fully determinable position of the throttle. In FIG. 1 of the drawings only the accelerator pedal 14 is shown, but the throttle mechanism itself could just as well have been represented. In all places of this description at which reference is made to the function of the accelerator pedal, the function of the throttle could, with full equivalency, have been referred to with reference to the evaluation apparatus.

With the apparatus of this invention it is possible to measure the torque delivered by a motor without having to bring in the intake vacuum as a measure for motor torque. This is particularly important in the case of motors of a type of construction modified to provide exhaust gases that are relatively pollution free compared to those of conventional motors. The evaluation apparatus here described has the advantage of having a simple circuit that lends itself easily to production by inexpensive means, while nevertheless providing sufficiently accurate values. Economic manufacture is made possible through the simple assembly of the circuit of the evaluation apparatus. Because of the small number of circuit components used, the circuit may be expected to have a high reliability.

I claim:

1. Apparatus to provide an electrical signal representative of torque of an internal combustion engine, to control electrical current flow through a magnet winding of a valve, comprising
   a first transducer means (23) responsive to the position ($\alpha$) of the throttle or of the accelerator pedal (14) of the engine, and providing a throttle position signal;
   second transducer means (25) measuring the speed of the engine shaft and providing a speed signal;
   a current controlled pressure regulator valve (22);
   and means (13) to generate an electrical resultant composite signal from said speed signal and said throttle signal to control current flow through said valve, in which the speed signal is modulated by the throttle signal, comprising
   an operational amplifier (52) and an output transistor (73) controlled by the operational amplifier;
   the operational amplifier having a direct input (51) connected to a combined output of said first and second transducer means (23, 25) and an inverting input (59);
   the transistor (73) being connected in series with said current controlled pressure regulator valve (22);
   means (78) deriving a signal representative of actual current flow in the transistor (73) and said valve (22);
   means (75) feeding back said valve current signal to the inverting input (59) of the operational amplifier (52) to provide for comparison of the actual current flow through said valve and commanded output signal;
   and an operational amplifier feedback circuit (71, 72) interconnecting the output (65) of the operational amplifier (52) and the inverting input (59) thereof.

2. Apparatus according to claim 1, wherein the operational amplifier (52) is coupled (74) to the base of the output transistor (73);
   the valve is connected in series with the emitter-collector path of the transistor (73);
   said means deriving an actual flow signal comprises a resistor (78) in series with said emitter-collector path;
   and the means feeding back said actual current flow signal comprises a second resistor (75) connected between the junction of said resistor (78) and the series circuit including said emitter-collector path, said resistor being connected to the inverting input of said operational amplifier.

3. Apparatus according to claim 1, wherein the operational amplifier feedback circuits comprises a parallel connected R/C circuit (71,72).

4. Apparatus as defined in claim 1 in which said first transducer means (23,46) and said second transducer means (25,41) are such as to provide an output in the form of an electrical voltage, and in which said means (13) for generating an electrical resultant signal is an electrical evaluation circuit (24,26) in which said transducer means (46,41) are interconnected.

5. Apparatus as defined in claim 1 in which said first transducer means is a resistance potentiometer (46) mechanically connected to the throttle or to the accelerator pedal (14) of said motor.

6. Apparatus as defined in claim 5 in which said second transducer means (25) includes limiting means for limiting voltage peaks and protecting said apparatus against inadvertent reverse connection, comprising a first diode (36) between the input (12) of said second transducer means (25) and the negative supply conductor (35) of a voltage source serving said apparatus and a second diode (34) connected between said input (12) of said second transducer means (25) and the positive supply conductor (33) of said voltage source, and in which said first and said second diodes (36,34) are connected in the blocking direction with respect to said voltage source.

7. Apparatus as defined in claim 1 in which the input of said second transducer means (41) is connected to an ignition interrupter contained in an ignition distributor (11) of said motor.

8. Apparatus as defined in claim 7 in which said second transducer means (25) comprises a rectifier (38), a charging capacitor (41) and a discharge resistor (42), in which said rectifier (38) is connected between the input (12) of said second transducer means and the ungrounded terminal of said charging capacitor (41) and that the output (37) of said second transducer means (25) is connected to a filter circuit (53,44,45) for smoothing the output voltage of said second transducer means (25).

9. Apparatus as defined in claim 1 in which said pressure regulator valve (22) is located in the hydraulic or pneumatic control circuit of at least one transmission coupling of a motor vehicle.

10. Apparatus as defined in claim 9 in which said pressure regulator valve is arranged to operate in the hydraulic or pneumatic control circuit of at least one main valve arranged to control a mechanical power transmission.

11. Apparatus as defined in claim 10 in which said hydraulic or pneumatic control circuit of said main valve is an anticipatory control circuit.

12. Apparatus as defined in claim 1 in which said first transducer means, said second transducer means and said means (13) for generating an electrical resultant signal are housed in a single compact casing.

* * * * *